3,431,311
PRODUCTION OF ALKANOLS
Leslie Ernest Cooper, Hull, and Kenneth George Pickup, London, England, assignors to The Distillers Company Limited, Edinburgh, Scotland, a British company
No Drawing. Continuation of application Ser. No. 215,264, Aug. 7, 1962. This application June 8, 1966, Ser. No. 556,243
Claims priority, application Great Britain, June 25, 1960, 22,335/60
U.S. Cl. 260—638       14 Claims
Int. Cl. C07c 29/14; B01j 11/82

The present invention relates to the production of alkanols from unsaturated aldehydes by hydrogenation, and this application is a continuation of application Ser. No. 215,264, filed Aug. 7, 1962, now abandoned, which in turn is a continuation-in-part of application Ser. No. 116,944, filed June 14, 1961 and now abandoned.

As commercially available, aldehydes which are suitable for hydrogenation to alkanols may contain impurities which render the production of alkanols of satisfactory purity difficult or impossible by known methods. It is an object of the present invention to provide a process for the production af alkanols from such impure aldehydes, which process can provide a product of improved purity.

It is known that aliphatic aldehydes can be hydrogenated over copper catalysts, but the alkanols so produced fail to satisfy requirements in respect of their purity, for example for the production of plasticiser esters, due to the presence of trace impurities which form objectionable colours when contacted with sulphuric acid or acid esterification catalysts. Various treatments have been tried, including hydrogenation in the liquid phase over nickel at superatmospheric pressures, but have not been fully satisfactory. It is a further object of the present invention to provide a process for the production of alkanols from aldehydes, the product of which process is satisfactory in respect to colour developed in contact with acids.

According to the present invention the process for the production of an alkanol comprises reacting in the vapour phase a compound selected from the group consisting of saturated and unsaturated aliphatic aldehydes having from 3 to 8 carbon atoms in the molecule with hydrogen in the presence of a supported copper catalyst and reacting the vaporised product with hydrogen in the presence of a supported copper-nickel catalyst to convert the aliphatic aldehyde to the alkanol.

The invention may be carried out, for example, by passing a mixture of hydrogen and the vapour of the aldehyde over the supported copper catalyst in one reactor and then passing the vaporised product with more hydrogen over the supported copper-nickel catalyst in a second reactor. The invention may also be carried out in one reactor in which the two catalysts are in separate zones of the reactor, the vapours passing first over the copper catalyst and then over the copper-nickel catalyst.

The copper catalyst is preferably supported on a siliceous earth such as kieselguhr. The supported catalyst conveniently contains 25% to 90% by weight of copper, based on the total weight of copper and supporting material. The supported copper catalyst may, if desired, contain any of the known modifiers of copper hydrogenation catalysts, for example zinc, magnesium, chromium, iron or compounds of these metals, or a phosphate, tungstate, chromate, dichromate, molybdate, silicate or metaborate.

The copper-nickel catalyst is also preferably supported on a siliceous earth such as kieselguhr. The supported catalyst conveniently contains 25% to 90%, preferably 45% to 70% by weight of total copper and nickel based on the total weight of copper, nickel and supporting material. The proportion of copper to nickel in the supported catalyst is preferably from 5:1 to 20:1 by weight.

The process of this invention is preferably carried out in a reactor heated externally to a temperature in the range 130° to 200° C.

The vapour of the aldehyde is preferably contacted with hydrogen in the presence of the supported copper catalyst to convert at least 80%, and desirably at least 90%, by weight of the aldehyde to the alkanol. The vaporised product consists of the alkanol formed together with small amounts of unconverted aldehyde and other substances. When the starting material is an unsaturated aldehyde, the vaporised product of the first stage of the reaction will also contain a proportion of the corresponding saturated aldehyde. The vaporised product may then be contacted with hydrogen in the presence of the supported copper-nickel catalyst to form more alkanol so that only trace amounts of aldehyde remain.

By the process of the invention, for example, crotonaldehyde or n-butyraldehyde may be converted to n-butanol and ethyl propyl acrolein or 2-ethyl-hexaldehyde may be converted to 2-ethyl hexanol. Other suitable feedstocks include acrolein, propionaldehyde, methacrolein, isobutyraldehyde, ethyl methyl acrolein and 2-methyl valeraldehyde. Thus it can be seen that alkanals and alkenals having 3 to 8 carbon atoms in the molecule are suitable aldehydes for use in the process of the invention. The following examples further illustrate the invention.

EXAMPLE 1

A vertical tube reactor was packed to one-fifth of its depth with a composition consisting of a mixture of 5.6% by weight of nickel oxide and 56.3% by weight of cupric oxide supported on kieselguhr, and then the remaining four-fifths of the reactor was packed with a composition consisting of 55.6% by weight of cupric oxide supported on kieselguhr and containing 1.5% by weight of alkali metal phosphate. The reactor was then heated to 170° C. and hydrogen was passed in to convert the nickel oxide and cupric oxide to nickel and copper respectively.

The reactor was surrounded by a heating jacket maintained at 140° C. Crotonaldehyde, prepared by the dehydration of acetaldol, was vaporised, mixed with hydrogen and passed in at the top of the reactor. The crotonaldehyde vapour was introduced at a rate of the equivalent of 0.3 part by volume of liquid crotonaldehyde per part by volume of total catalyst in the reactor. The molar ratio of hydrogen fed to crotonaldehyde vapour fed was 6:1. The crotonaldehyde was converted to n-butanol. The reaction product was passed as vapour from the base of the reactor and was then condensed. The condensate was n-butanol together with 1% by weight of n-butyraldehyde and less than 0.015% by weight of crotonaldehyde; no crotyl alcohol was present and the loss due to hydrocarbon formation was less than 0.5%.

The condensate was distilled and highly pure n-butanol was produced.

In contrast with the hydrogenation of this example, when the same procedure was carried out using the reactor packed entirely with the copper/kieselguhr catalyst containing the alkali metal phosphate, the reaction product was condensed to form n-butanol containing 15% by weight of n-butyraldehyde, 0.1% by weight of crotonaldehyde and 1% by weight of crotyl alcohol. This condensate was distilled by a method identically similar to that used to recover purified n-butanol prepared over the copper and copper/nickel catalysts in this example, but the n-butanol prepared had an unacceptable quality due to the presence of unremoved impurities.

EXAMPLE 2

A mixture of n-butanol with 11.5% by weight of n-butyraldehyde and 0.05% by weight of crotonaldehyde, produced by passing crotonaldehyde, prepared by the dehydration of acetaldol, with hydrogen over the alkali metal phosphate modified copper/kieselguhr catalyst described in Example 1, was passed with hydrogen over a bed of a catalyst consisting of 45% by weight of copper, 5% by weight of nickel and 50% by weight of kieselguhr, in a reactor surrounded by a heating jacket maintained at 140° to 170° C. The reaction product was removed as vapour and condensed and the condensate was then distilled. A highly pure butanol was produced.

The n-butyraldehyde content of the reaction product condensate was only 1% by weight and the crotonaldehyde content 0.01% by weight. The loss due to hydrocarbon formation was under 0.5%.

EXAMPLE 3

Crude 2-ethyl hexanol was prepared by passing ethyl propyl acrolein prepared by the dehydration of butyraldol with hydrogen over a copper/kieselguhr catalyst in the vapour phase. The condensed product of this reaction contained 7.5% by weight of 2-ethyl hexaldehyde and 0.1% by weight of ethyl propyl acrolein. This product was passed in the vapour phase with hydrogen over a bed of catalyst consisting of 45% by weight of copper, 5% by weight of nickel, and 50% by weight of kieselguhr, in a reactor surrounded by a heating jacket maintained at 140° to 170° C.

The liquid volume feed rate of crude 2-ethyl hexanol was 0.27 volume per unit volume of catalyst per hour and the corresponding figure for the hydrogen gas volume was 53 volumes per unit volume of catalyst per hour. The condensate from the reaction product contained 0.05% by weight of ethyl propyl acrolein and 2.5% by weight of 2-ethyl hexaldehyde. The condensate was distilled and a highly pure 2-ethyl hexanol was obtained.

In contrast with the hydrogenation of this example, crude 2-ethyl hexanol produced by hydrogenation of similar ethyl propyl acrolein over various copper-containing catalysts under conditions giving residual concentrations of 2-ethyl hexaldehyde and ethyl propyl acrolein of 2.0% and 0.1%, respectively, gave on distillation, by methods identically similar to those used in the recovery of 2-ethyl hexanol prepared over the copper and copper/nickel catalysts in this example, 2-ethyl hexanol of unacceptable quality.

EXAMPLE 4

A vertical tube reactor was packed to one-fifth of its depth with a composition consisting of a mixture of 5.6% by weight of nickel oxide and 56.3% by weight of cupric oxide supported on kieselguhr, and then the remaining four-fifths of the reactor was packed with a composition consisting of 55.6% by weight of cupric oxide supported on kieselguhr and containing 1.5% by weight of alkali metal phosphate. The reactor was heated to 170° C. and hydrogen was passed in to convert the nickel oxide and cupric oxide to nickel and copper respectively.

The reactor was surrounded by a heating jacket maintained at 140° C. Butyraldehyde was vaporised, mixed with hydrogen and passed in at the top of the reactor. The butyraldehyde vapour was introduced at a rate of the equivalent of 0.3 part by volume of liquid butyraldehyde per part by volume of total catalyst in the reactor. The molar ratio of hydrogen fed to butyraldehyde vapour fed was 6:1. The butyraldehyde was converted to n-butanol. The reaction product was passed as vapour from the base of the reactor and was then condensed. The condensate was n-butanol together with some 1% by weight of n-butyraldehyde.

The condensate was distilled and highly pure n-butanol was produced.

When the butyraldehyde was reacted with hydrogen in a similar reactor but changed with the supported copper catalyst alone, using otherwise identical reaction conditions, the n-butanol distilled from the condensate was unacceptable in respect of acid colour.

What is claimed is:
1. The process for the production of an alkanol which comprises reacting in the vapor phase a compound selected from the group consisting of alkanals and alkenals having from 3 to 8 carbon atoms in the molecule with hydrogen in the presence of a supported catalyst selected from the group consisting of an unmodified copper catalyst and a copper catalyst modified with a modifier selected from the group of zinc, magnesium, chromium, iron and an alkali metal phosphate until at least 80% by weight of the aldehyde is converted to the alkanol, and reacting the vaporized product with hydrogen in the presence of a supported copper-nickel catalyst to convert the aldehyde to the corresponding alkanol, said process being carried out at a temperature in the range of about 130° to about 200° C.
2. The process as claimed in claim 1 in which the initial stage copper catalyst is supported on kieselguhr.
3. The process as claimed in claim 1 in which the initial stage copper catalyst contains between 25% and 90% by weight of copper based on the total weight of copper and catalyst support.
4. The process as claimed in claim 1 in which the copper-nickel catalyst is supported on kieselguhr.
5. The process as claimed in claim 1 in which the copper-nickel catalyst contains 25% to 90% by weight of total copper and nickel based on the total weight of copper, nickel and catalyst support.
6. The process as claimed in claim 1 in which the ratio of the proportion of copper and nickel is between 5:1 and 20:1 by weight.
7. The process as claimed in claim 1 in which the aldehyde is n-butyraldehyde.
8. The process as claimed in claim 1 in which the aldehyde is crotonaldehyde.
9. The process as claimed in claim 1 in which the aldehyde is ethyl propyl acrolein.
10. The process for the production of an alkanol which comprises reacting in the vapor phase a compound selected from the group consisting of alkanals and alkenals having from 3 to 8 carbon atoms in the molecule with hydrogen in the presence of a supported copper catalyst modified with a modifier selected from the group of zinc, magnesium, chromium, iron and an alkali metal phosphate until at least 80% by weight of the aldehyde is converted to the alkanol, and reacting the vaporized product with hydrogen in the presence of a supported copper-nickel catalyst to convert the aldehyde to the corresponding alkanol, said process being carried out at a temperature in the range of about 130° to about 200° C.
11. The process as claimed in claim 10, in which the initial stage copper catalyst contains between 25% and 90% by weight of copper based on the total weight of copper and catalyst support.
12. The process as claimed in claim 10 in which the initial stage copper catalyst contains a minor proportion of alkali metal phosphate as modifier.
13. The process as claimed in claim 10 in which the copper-nickel catalyst contains 25% to 90% by weight of total copper and nickel based on the total weight of copper, nickel and catalyst support.
14. The process as claimed in claim 10 in which the ratio of the proportion of copper and nickel is between 5:1 and 20:1 by weight.

References Cited
UNITED STATES PATENTS

| 1,724,761 | 8/1929 | Holden. |
| 2,009,948 | 7/1935 | Schnidt et al. |
| 2,060,267 | 11/1936 | Toussaint. |
| 2,119,899 | 6/1938 | Zorn et al. |

(Other references on following page)

| | UNITED STATES PATENTS | |
|---|---|---|
| 2,150,270 | 3/1939 | Durrans et al. |
| 2,549,416 | 4/1951 | Brooks. |
| 3,118,954 | 1/1964 | Robbins et al. |
| | FOREIGN PATENTS | |
| 316,399 | 8/1929 | Great Britain. |
| 398,982 | 9/1933 | Great Britain. |

LEON ZITVER, *Primary Examiner.*

J. E. EVANS, *Assistant Examiner.*

U.S. Cl. X.R.

260—601; 252—437, 459, 454